(12) United States Patent
Sipola

(10) Patent No.: US 6,529,561 B2
(45) Date of Patent: Mar. 4, 2003

(54) DATA TRANSMISSION IN RADIO SYSTEM

(75) Inventor: Jussi Sipola, Oulu (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/852,298

(22) Filed: May 10, 2001

(65) Prior Publication Data

US 2002/0009157 A1 Jan. 24, 2002

Related U.S. Application Data

(63) Continuation of application No. PCT/FI00/00755, filed on Sep. 7, 2000.

(30) Foreign Application Priority Data

Sep. 10, 1999 (FI) .............................................. 19991932

(51) Int. Cl.[7] .............................................. H04L 27/20
(52) U.S. Cl. .................. 375/295; 375/240.27; 714/755; 714/748
(58) Field of Search ............................ 375/295, 240.24, 375/240.27; 714/755, 788, 748, 751, 752, 761, 762

(56) References Cited

U.S. PATENT DOCUMENTS

| | | | |
|---|---|---|---|
| 5,657,325 A | | 8/1997 | Lou et al. |
| 5,946,320 A | * | 8/1999 | Decker ........................ 370/428 |
| 6,061,387 A | * | 5/2000 | Yi .............................. 370/208 |
| 6,370,669 B1 | * | 4/2002 | Eroz et al. ................... 714/774 |

FOREIGN PATENT DOCUMENTS

| | | |
|---|---|---|
| EP | 771 092 | 5/1997 |
| EP | 966 124 | 12/1999 |
| WO | WO 98/31106 | 7/1998 |
| WO | WO 98/48517 | 10/1998 |
| WO | WO 00/25469 | 5/2000 |

OTHER PUBLICATIONS

Ji et al., "Concatenated Punctured Turbo Reed–Solomon Codes in a Hybrid FEC/ARQ DS/SSMA Data Network," Dept. of Electrical Engineering and Computer Science, Univ. of Michigan, Ann Arbor, MI, IEEE, 1999, pp. 1678–1682.

(List continued on next page.)

Primary Examiner—Stephen Chin
Assistant Examiner—Kevin Kim
(74) Attorney, Agent, or Firm—Pillsbury Winthrop LLP

(57) ABSTRACT

The invention relates to a method of transmitting data in a radio system from a transmitter to a receiver, and to a radio system using the method, a radio transmitter and a radio receiver. A transmitter (260) comprises a channel coder (202) for channel coding a data block into a coded data block by using a selected channel coding and for puncturing the coded data block by using a first puncturing pattern, and transmission means (204) for transmitting the coded data block punctured by the first puncturing pattern to a receiver (264). The receiver (264) comprises a channel decoder (218) for decoding the received coded data block, means (224) for detecting a need for retransmission of the received coded data block, and means (204) for transmitting a retransmission request of the coded data block to the transmitter (260). The channel coder (202) increases the code rate of the coded data block to be retransmitted by puncturing the coded data block coded by the channel coding of the original transmission by using a second puncturing pattern comprising fewer symbols to be transmitted than the first puncturing pattern. The transmission means (204) transmit the coded data block punctured by the second puncturing pattern to the receiver (264). The receiver (264) comprises means (222) for combining a received coded data block (216) punctured by the first puncturing pattern and a received coded data block (220) punctured by the second puncturing pattern. The channel decoder (218) decodes the channel coding of the combined coded data block.

10 Claims, 6 Drawing Sheets

OTHER PUBLICATIONS

Hagenauer, "Rate–Compatible Punctured Convolutional Codes (RCPC Codes) and Their Applications," IEEE Transactions on Communication, vol. 36, No. 4, Apr. 1988, pp. 389–400.

Feria et al., "Seamless Data–Rate Change Using Punctured Convolutional Codes for Time–Varying Signal–to–Noise Ratio," Jet Propulsion Laboratory, California Institute of Technology, Pasadena, CA, IEEE, 1995, pp. 342–346.

* cited by examiner

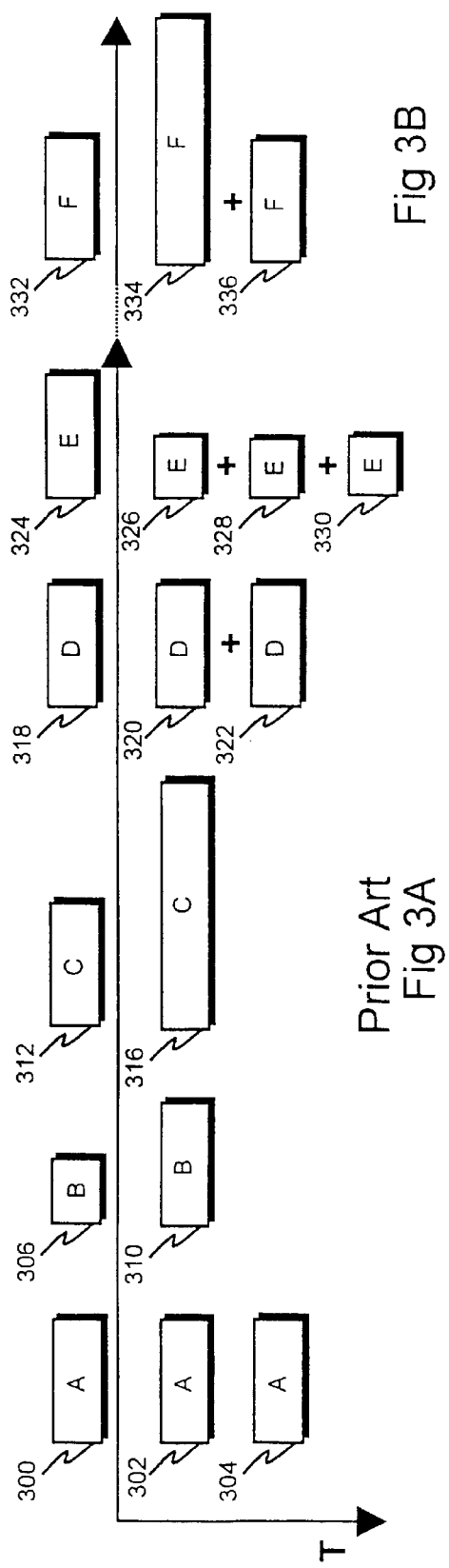
Prior Art
Fig 3A
Fig 3B
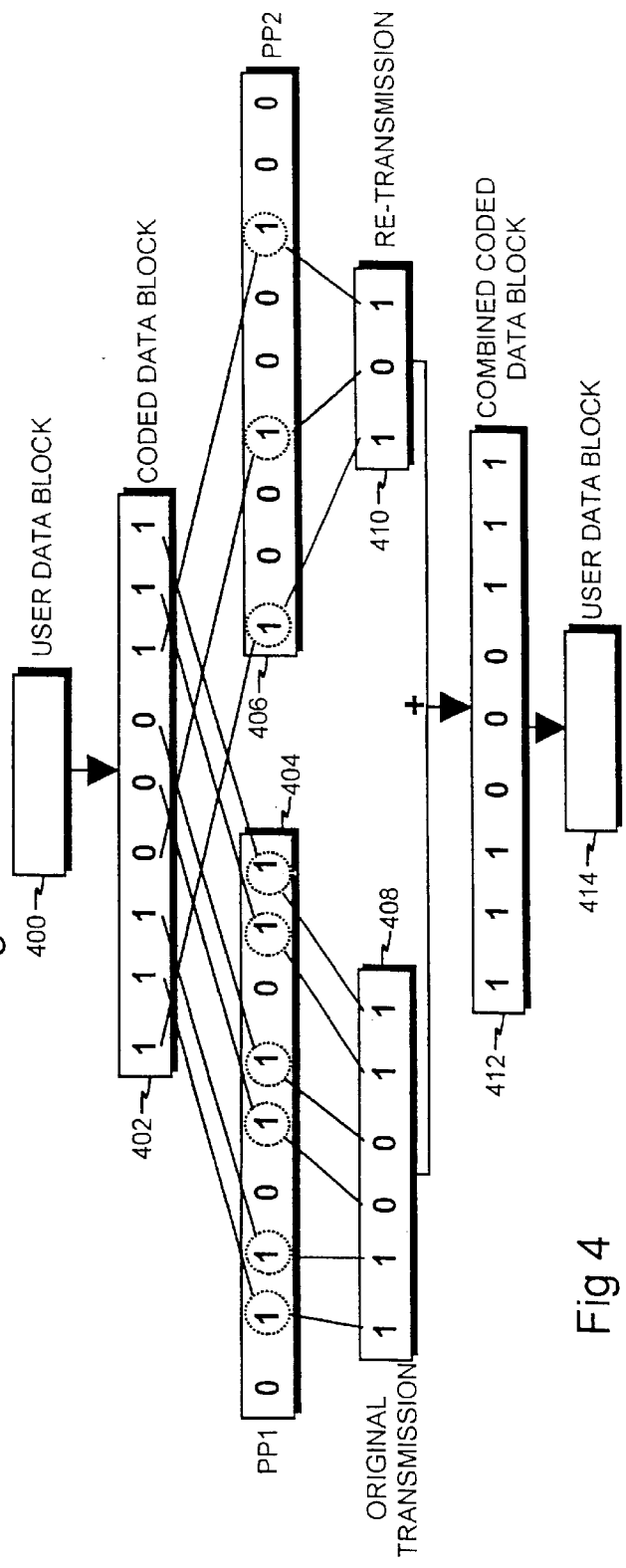
Fig 4

DATA TRANSMISSION IN RADIO SYSTEM

This application is a continuation of international patent application No. PCT/FI00/00755 filed Sep. 7, 2000, which designated the United States, and that international patent application was published under PCT Article 21(2) in English.

FIELD OF THE INVENTION

The invention relates to a method of transmitting data in a radio system from a transmitter to a receiver, and to a radio system, a radio transmitter and a radio receiver using the method. The use of the method is described in EGPRS (Enhanced General Packet Radio Service).

BACKGROUND OF THE INVENTION

EGPRS (Enhanced General Packet Radio Service) is a system based on GSM (Global System for Mobile Communications) utilising packet- switched transmission. EGPRS employs EDGE (Enhanced Data Rates for GSM Evolution) technique in order to increase data transmission capacity. In addition to GMSK (Gaussian Minimum-Shift Keying) modulation normally used in the GSM, 8-PSK (8-Phase Shift Keying) modulation can be used for packet data channels. The purpose is mainly to implement non-realtime data transmission services, such as copying files and use of an Internet browser, but also real-time services as packet-switched services for transmitting speech and video, for example. In principle, data transmission capacity can vary from a few kbit/s up to 400 kbit/s.

Also other procedures are used in order to increase capacity, for example blind detection of modulation, link adaptation and incremental redundancy.

Blind detection of modulation means that it is not necessary to signal to a receiver which modulation method is being used but the receiver detects the modulation method when it receives a signal.

Link adaptation refers to changing the code rates of blocks to be transmitted on the basis of measurements carried out on the channel. The code rate can be changed between retransmissions of the same block. Another alternative is to change the code rate between successive blocks, provided, however, that all transmissions of a single block are coded by the same code rate. The purpose is to optimize the use of radio resources taking instantaneous variations in the conditions of the radio interface into account. The purpose is to optimize user data throughput and to minimize delay.

The code rate of a block refers to the ratio of the number of user data bits to the coded data bits of a channel. If, for example, 100 user data bits are coded into 200 data bits to be transmitted over the channel, the code rate obtained is $100/200=½$.

FIG. 3A shows examples of changing the code rate of a block. In FIG. 3A, a data block to be transmitted is shown above the X-axis, and blocks transmitted actually over the radio link are shown below the X-axis. The Y-axis denotes passage of time. Block sizes are scaled in accordance with each other, i.e. the larger the block, the more bits to be transmitted said block comprises.

A block A 300 is to be transmitted over the radio link. First transmission 302 fails, so the transmission is repeated 304. Link adaptation was not carried out, since as can be seen from FIG. 3A, the blocks 302, 304 are equal in size. The code rate in both transmissions 302, 304 is 1.

In comparison with the transmission of the block A 300, link adaptation is carried out in the transmission of a block B 306 by changing the amount of user data. Compared with the block A 300, it is detected that the size of the block B 306 is reduced by half. The code rate of a block 310 to be transmitted has been reduced to ½.

Another way to carry out link adaptation is to change the size of a data block to be transmitted over the radio link. Compared with the transmission of the block A 300, in the transmission of a block C 312 link adaptation is carried out by changing the size of the data block to be transmitted. The code rate of a block 316 to be transmitted is ½ since the size of the data block to be transmitted over the link has been doubled.

Under favourable conditions, for example, coding can be reduced, which means that more user payload can be transferred. Similarly, one modulation method can be better suited than the other to certain conditions on the radio interface. Different combinations of modulation and channel coding can be called modulation and coding schemes MCS.

If the coding conditions of a channel change extremely rapidly, it is impossible for the system to optimally select the code rate for the forthcoming transmission in advance. Incremental redundancy enables better adaptation to changing conditions. In incremental redundancy, a receiver is equipped with a memory to store the bits of radio blocks that have been received erroneously. Retransmitted radio blocks are then combined with the stored radio blocks, whereafter the receiver attempts to decode the block. Since there are more coded channel data bits to be used for decoding after the combining and the number of user data bits remains the same, the effective code rate of the block is decreased after retransmission, which makes decoding more feasible. An example of such a protocol is the hybrid FEC/ARQ (Forward Error Correction/Automatic Repeat Request), which uses error correction coding in order to decrease the number of retransmissions.

The effective code rate of the channel is adapted automatically since the channel conditions determine the number of necessary retransmissions, which in turn determines the code rate. FIG. 3A shows the simplest retransmission method for a data block D 318 to be transmitted. An original transmission 320 is carried out by a code rate 1, and a first retransmission 322 also by a code rate 1. After the first retransmission the code rate of the combined data block is ½. A second retransmission would yield a code rate ⅓, a third retransmission a code rate ¼, and this could be continued until it would be possible to decode the combined data block.

The problem with the retransmission method disclosed is that the effective code rates are quantized with relatively large steps: after one retransmission the code rate is only half of the original. This means that the capacity of the system is wasted since a smaller reduction in the code rate would often be sufficient. A solution that has been provided discloses a method wherein the data block to be transmitted is divided into sub-blocks, for example into two sub-blocks, the number of the sub-blocks being denoted by D, which is described in FIG. 3A by a block E 324. The code rate used in the transmission of an original block 326 is 2. After a first retransmission 328 the code rate is 1, after a second retransmission 330 the code rate is ⅔, after a third retransmission the code rate would be ½, after a fourth retransmission the code rate would be ⅖. The drawback of this method is that even under ideal channel conditions transmission of at least D data block(s) is necessary before the data block can be decoded, i.e. the code rate must be 1 at most.

BRIEF DESCRIPTION OF THE INVENTION

An object of the invention is thus to provide a method and an apparatus implementing the method so as to enable efficient simultaneous utilization of link adaptation and incremental redundancy. This is achieved by the method disclosed below of transmitting data in a radio system from a transmitter to a receiver, the method comprising: channel coding a data block into a coded data block by using a selected channel coding; puncturing the coded data block by using a first puncturing pattern; transmitting the coded data block punctured by the first puncturing pattern to the receiver; detecting a need for retransmission of the received coded data block; transmitting a retransmission request of the coded data block to the transmitter. The method further comprises: increasing the code rate of the coded data block to be retransmitted by puncturing the coded data block coded by the channel coding of the original transmission by using a second puncturing pattern comprising fewer symbols to be transmitted than the first puncturing pattern; transmitting the coded data block punctured by the second puncturing pattern to the receiver; combining the received coded data block punctured by the first puncturing pattern and the received coded data block punctured by the second puncturing pattern; and decoding the channel coding of the combined coded data block.

The invention also relates to a radio system comprising: a transmitter and a receiver having a radio connection to the transmitter; the transmitter comprising a channel coder for channel coding a data block into a coded data block by using a selected channel coding and for puncturing the coded data block by using a first puncturing pattern, and transmission means for transmitting the coded data block punctured by the first puncturing pattern to the receiver; the receiver comprising a channel decoder for decoding the received coded data block, means for detecting a need for retransmission of the received coded data block, and means for transmitting a retransmission request of the coded data block to the transmitter. The channel coder increases the code rate of the coded data block to be retransmitted by puncturing the coded data block coded by the channel coding of the original transmission by using a second puncturing pattern comprising fewer symbols to be transmitted than the first puncturing pattern; the transmission means transmit the coded data block punctured by the second puncturing pattern to the receiver; the receiver comprises means for combining a received coded data block punctured by the first puncturing pattern and a received coded data block punctured by the second puncturing pattern; the channel decoder decodes the channel coding of the combined coded data block.

The invention further relates to a radio transmitter comprising: a channel coder for channel coding a data block into a coded data block by using a selected channel coding and for puncturing the coded data block by using a first puncturing pattern; transmission means for transmitting the coded data block punctured by the first puncturing pattern to a receiver; means for receiving a retransmission request of the coded data block. The channel coder increases the code rate of the coded data block to be retransmitted by puncturing the coded data block coded by the channel coding of the original transmission by using a second puncturing pattern comprising fewer symbols to be transmitted than the first puncturing pattern; the transmission means transmit the coded data block punctured by the second puncturing pattern to the receiver.

The invention still further relates to a radio receiver comprising: reception means for receiving a coded data block channel-coded by a selected channel coding and punctured by a first puncturing pattern; a channel decoder for decoding the received coded data block; means for detecting a need for retransmission of the received coded data block; means for transmitting a retransmission request of the coded data block to a transmitter. The reception means receive the retransmitted coded data block whose code rate has been increased by puncturing the coded data block coded by the channel coding of the original transmission by using a second puncturing pattern comprising fewer symbols to be transmitted than the first puncturing pattern; means for combining the received coded data block punctured by the first puncturing pattern and the received coded data block punctured by the second puncturing pattern; a channel coder decodes the channel coding of the combined coded data block.

The preferred embodiments of the invention are disclosed in the dependent claims.

The invention is based on the idea that the same channel coding has been used in the coding of the originally transmitted data block and the retransmitted data block, and the code rates of the two transmissions are made to differ by using different puncturing. Hence, despite the different code rates, the data blocks can be combined.

The advantage achieved by the method and apparatus of the invention is that there is a sufficiently dense range of effective code rates to enable the code rate required by the channel conditions to be selected relatively accurately, which saves the valuable radio resource of the system.

BRIEF DESCRIPTION OF THE DRAWINGS

The invention is now described in closer detail in connection with the preferred embodiments with reference to the accompanying drawings, in which FIG. 3A shows known methods already described for implementing link adaptation and incremental redundancy, FIG. 3B shows how combined link adaptation and incremental redundancy are implemented in accordance with the invention, FIG. 4 illustrates an example of combining an originally transmitted data block and a retransmitted data block in accordance with the invention.

DETAILED DESCRIPTION OF THE INVENTION

Figure 1A:
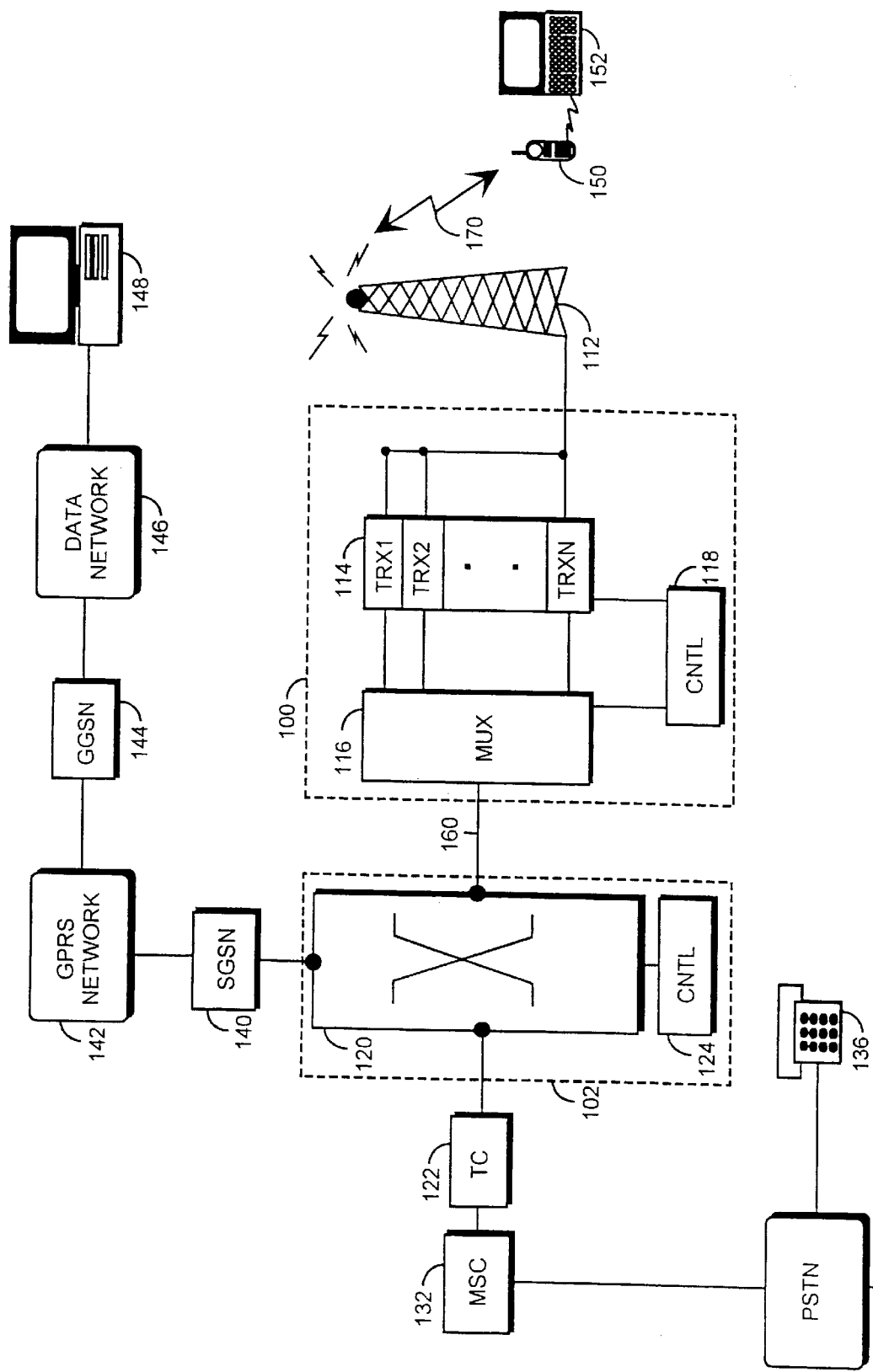
FIG. 1A is a block diagram of a cellular radio network.

Referring to FIG. 1A, a typical structure of a radio system of the invention and its connections to a fixed telephone network and a packet transmission network will be described. FIG. 1A only includes essential blocks for describing the invention, but it will be obvious to one skilled in the art that a common packet cellular radio network also includes other functions and structures that need not be described in closer detail here. The invention is most preferably used in EGPRS. The invention functions both on the uplink and the downlink.

A cellular radio network typically comprises the infrastructure of a fixed network, i.e. a network part and subscriber terminals 150 that can be fixedly located, located in a vehicle or portable terminals to be carried around, for example. The network part comprises base stations 100. Communicating with the several base stations 100, a base station controller 102 in turn controls the base stations in a centralized manner. The base station 100 comprises transceivers 114. The base station 100 typically comprises 1 to 16 transceivers 114. One transceiver 114 provides one TDMA (Time Division Multiple Access) frame, i.e. typically eight time slots, with radio capacity.

The base station 100 comprises a control unit 118 controlling the operation of the transceivers 114 and a multiplexer 116. The multiplexer 116 places the traffic channels and the controlling channels used by the plurality of transceivers 114 over one transmission link 160. The structure of the transmission link 160 is clearly defined and it is called an Abis interface.

The transceivers 114 of the base station 100 communicate with an antenna unit 112 implementing a duplex radio connection 170 to the subscriber terminal 150. Also in the duplex radio connection 170, the structure of the frames to be transmitted is defined in detail, and it is called an air interface.

The subscriber terminal 150 can be a common mobile telephone, for example, to which a portable computer 152 can be connected by an extension card, which portable computer can be used in ordering and processing packets.

The base station controller 102 comprises a switching field 120 and a control unit 124. The switching field 120 is used for switching speech and data and for connecting signalling circuits. The base station system comprising the base station 100 and the base station controller 102 further comprises a transcoder 122. The transcoder 122 is usually located as close to a mobile services switching centre 132 as possible since speech can thus be transmitted in the form of cellular radio network between the transcoder 122 and the base station controller 102 by using as little transmission capacity as possible.

The transcoder 122 converts the different digital coding modes of speech used between a public telephone network and a mobile telephone network into compatible ones, for example from the 64 kbit/s form of the fixed network into another form (13 kbit/s, for example) and vice versa. The control unit 124 performs call control, mobility management, collection of statistical data and signalling.

As can be seen from FIG. 1A, the switching field 120 can perform switching (depicted by black dots) to a public switched telephone network PSTN 134 via the mobile services switching centre 132 and to a packet transmission network 142. A typical terminal 136 in the public switched telephone network 134 is a common telephone or an integrated services digital network ISDN telephone.

The connection between the packet transmission network 142 and the switching field 120 is established by a serving GPRS support node SGSN 140. The serving GPRS support node 140 serves to transfer packets between the base station system and a gateway GPRS support node GGSN 144, and to keep a record of the location of the subscriber terminal 150 in its area.

The gateway GPRS support node 144 connects the public packet transmission network 146 and the packet transmission network 142. An Internet protocol or X.25 protocol can be used on the interface. By encapsulation, the gateway GPRS support node 144 hides the internal structure of the packet transmission network 142 from the public packet transmission network 146, so for the public packet transmission network 146 the packet transmission network 142 resembles a sub-network, the public packet transmission network 146 being able to address packets to the subscriber terminal 150 located therein and to receive packets therefrom.

The packet transmission network 142 is typically a private network which uses an Internet protocol carrying signalling and tunnelled use data. As regards the architecture and protocols below the Internet protocol layer, the structure of the network 142 may vary operator-specifically.

The public packet transmission network 146 can be a global Internet, for example, to which a terminal 148, a server computer, for example, with a connection thereto wants to transfer packets to the subscriber terminal 150.

Figure 1B:
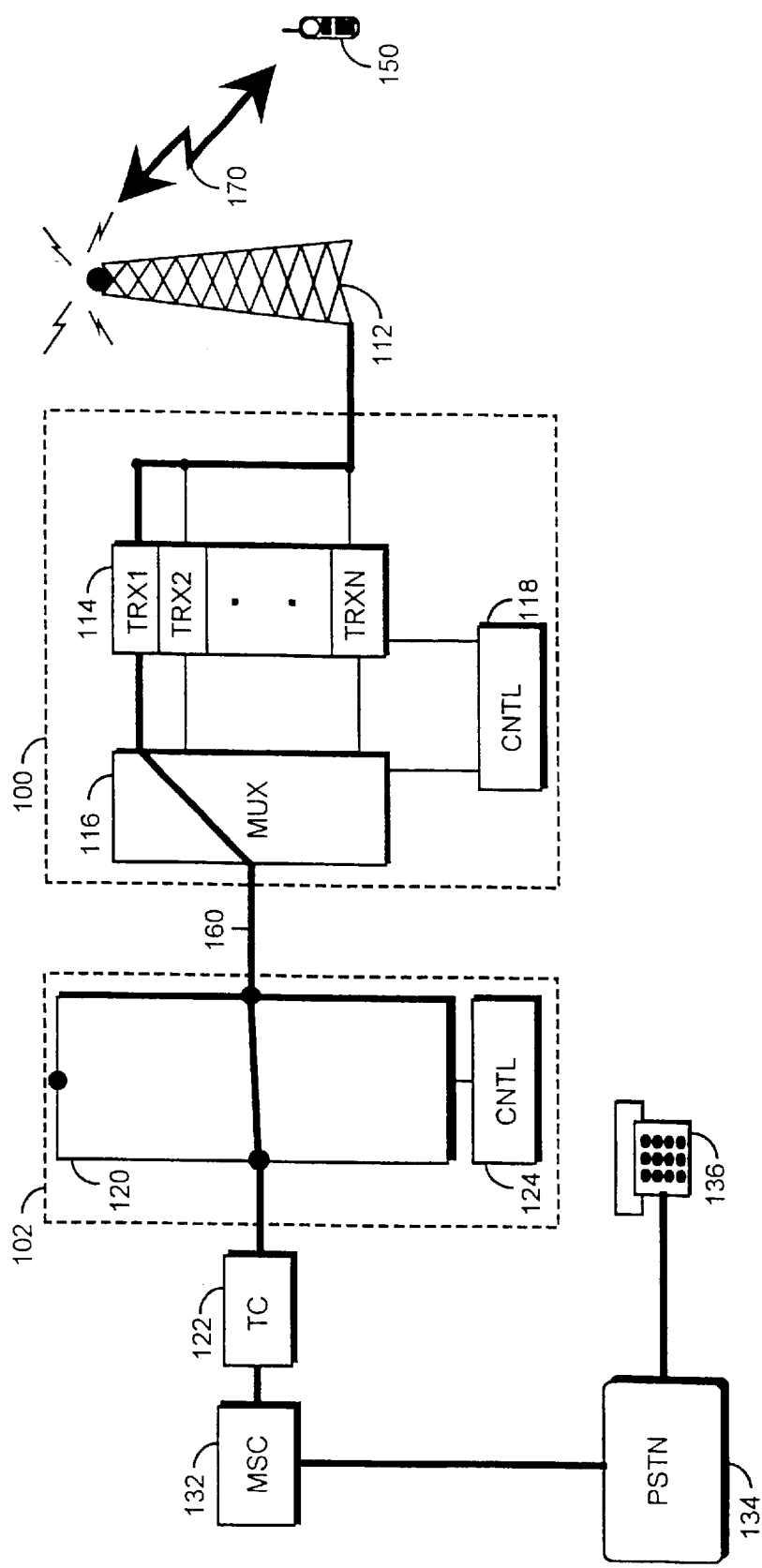
FIG. 1B shows a circuit-switched connection.

FIG. 1B shows how a circuit-switched transmission link is established between the subscriber terminal 150 and the terminal 136 of the public switched telephone network. The bold line in the figures denote how data travels through the system on the air interface 170, from the antenna 112 to the transceiver 114 and from there, multiplexed at the multiplexer 116 along the transmission link 160 to the switching field 120, where a connection is established to the output heading to the transcoder 122, and from there onwards through the connection established in the mobile services switching centre 132 to the terminal 136 connected to the public switched telephone network 134. In the base station 100 the control unit 118 controls the multiplexer 116 in the transmission, and in the base station controller 102 the control unit 124 controls the switching field 120 to carry out a correct connection.

Figure 1C:
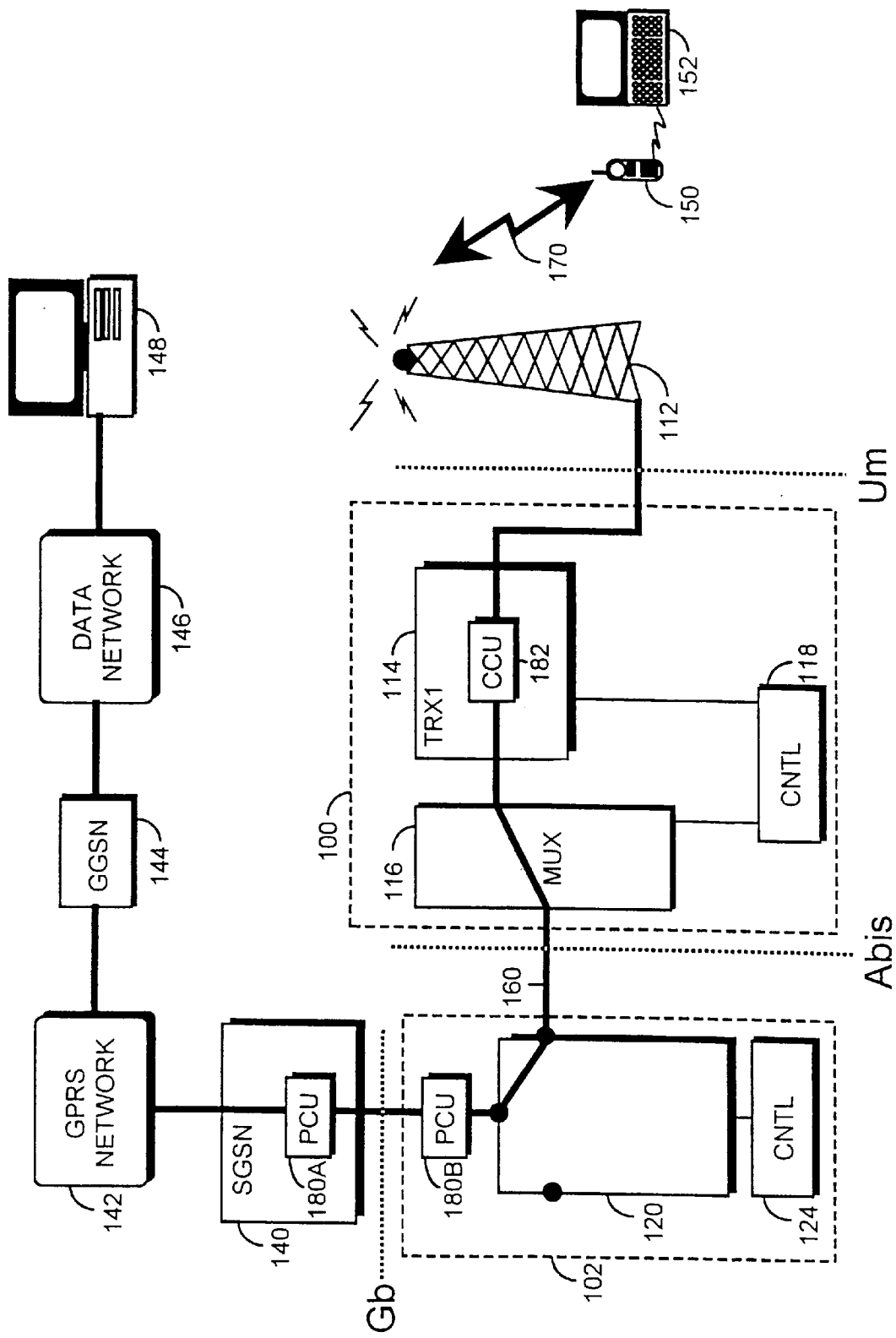
FIG. 1C shows a packet-switched connection.

FIG. 1C shows a packet-switched transmission link. The portable computer 152 is now connected to the subscriber terminal 150. The bold line denotes how data to be transferred travels from the server computer 148 to the portable computer 152. Naturally, data can also be transferred in the opposite direction, i.e. from the portable computer 152 to the server computer 148. Data travels through the system on the air interface 170, i.e. the Um interface, from the antenna 112 to the transceiver 114 and from there, multiplexed in the multiplexer 116 along the transmission link 160 on the Abis interface to the switching field 120, where a connection is established to the output heading to the serving GPRS support node 140 on the GB interface, from the serving GPRS support node 140 data is supplied along the packet transmission network 142 through the gateway GPRS support node 144 and is connected to the server computer 148 connected to the public packet transmission network 146.

For the sake of clarity, FIGS. 1B and 1C do not describe a case wherein both circuit-switched and packet-switched data is transferred simultaneously. However, this is both feasible and common since the capacity free from circuit-switched data transmission can be flexibly used to implement packet-switched transmission. A network can also be built wherein circuit-switched data is not transferred at all, only packet data. In such a case, the structure of the network can be simplified.

Let us return to FIG. 1C. The network part of the packet cellular radio network thus comprises the base station 100 and the transceiver 114 implementing the Um interface at the base station 100.

In addition to the above, two specific elements are known in the GPRS: a channel codec unit CCU and a packet control unit PCU. The CCU is responsible for channel coding, including forward error coding FEC, and interleaving, radio channel measurement functions, such as quality level of a received signal, reception power of a received signal, and information relating to measurements of timing advance. The tasks of the PCU include segmenting and re-assembling a logical link control LLC frame, automatic repeat request ARQ functions, scheduling a packet data channel PDCH, channel access control and radio channel management functions.

A CCU 182 is located in the base station 100 and, depending on the implementation, it can be regarded as a time-slot-specific or a transceiver -specific unit. A PCU 180A/180B is connected to the CCU 182 through the Abis interface. The PCU can be located at the base station 100, the base station controller 102 or the serving GPRS support node 140. FIG. 1C shows the PCU located at the base station controller 102 or the serving GPRS support node 140, but for the sake of clarity the PCU is not shown located at the base station 100.

Figure 5:
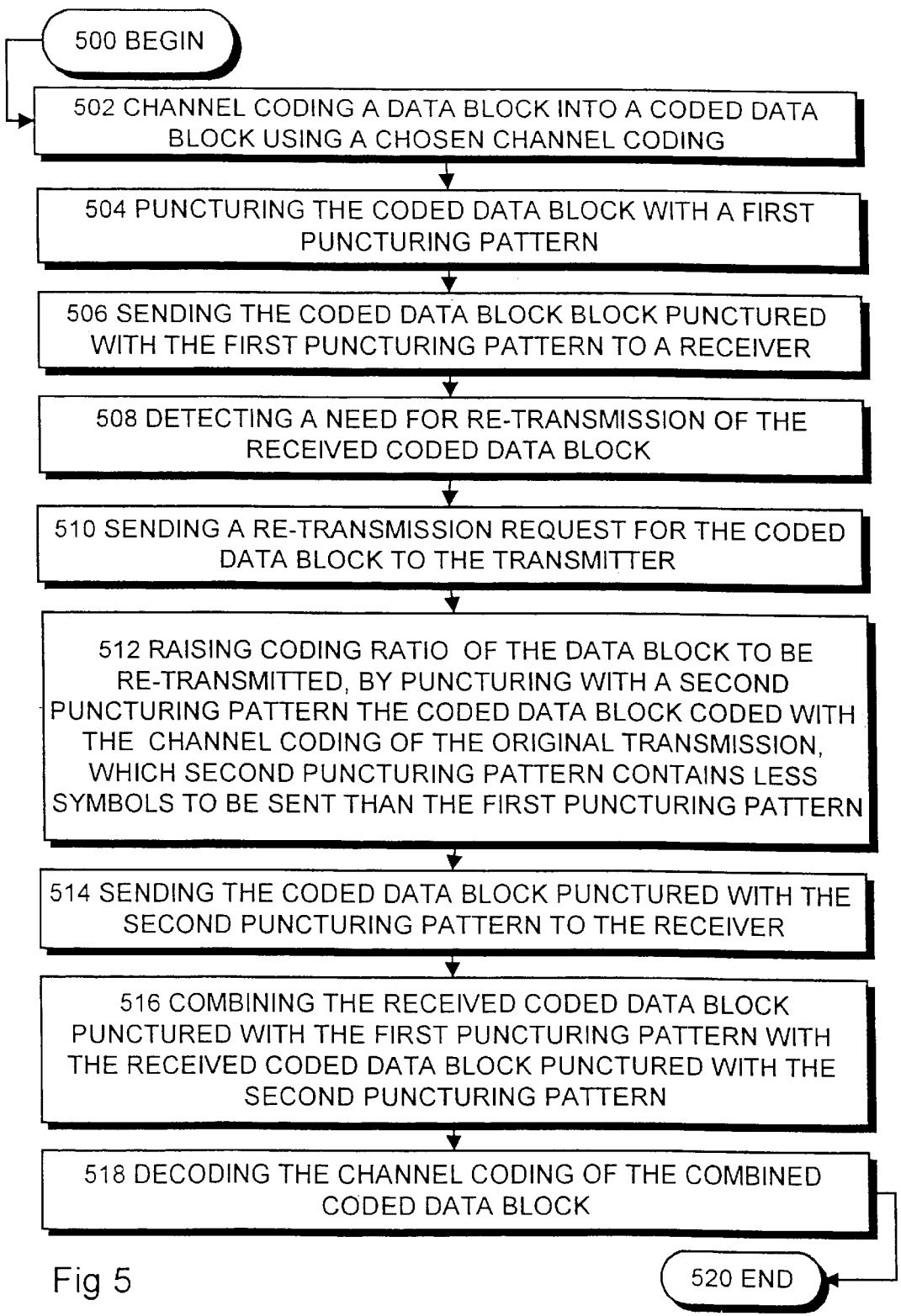
FIG. 5 is a flow diagram illustrating a data transmission method of the invention.

Next, FIG. 5 shows the method of the invention for transmitting data in a radio system from a transmitter to a receiver. In addition, an example of FIG. 4 will be described. The method is initiated in block 500.

In block 502, a data block 400 is channel-coded into a coded data block 402 by using a selected channel coding. In the example of FIG. 4, the data block 400 comprising user data is coded by a code rate ⅓, i.e. each data symbol is represented by three channel-coded symbols. For the sake of simplicity, it is assumed in the example that there are three user data symbols, in which case there are nine channel-coded symbols, i.e. a bit sequence 111000111. In the present application, channel coding refers to a known method of performing channel coding, for example block coding, convolutional coding or some coding method developed from convolutional coding, excluding, however, puncturing from channel coding.

Next, in block 504, the coded data block 402 is punctured by using a first puncturing pattern 404. Puncturing refers to removal coding, i.e. a procedure where the number of coded symbols is decreased by removing a certain number of symbols. The symbols to be removed can be defined by a puncturing pattern. In the example, the first puncturing pattern 404 comprises bits 011011011. The 0 bit denotes that the channel-coded symbol located at the point in question is removed, while the 1 bit is not removed. Hence, the first puncturing pattern 404 removes the first symbol and every third symbol thereafter. In a special case, the first puncturing pattern 404 can be such that it does not remove any symbol.

In block 506, a coded data block 408 punctured by the first puncturing pattern 404 is transmitted to the receiver. In accordance with FIG. 4, the punctured coded data block 408 used in this original transmission comprises symbols 110011, i.e. the second, third, fifth, sixth, eighth and ninth original channel-coded symbol.

In block 508, a need for retransmission of the received coded data block 408 is detected. The need for retransmission means that the receiver cannot decode the received data block 408. This can be detected either by an error detection code or by the fact that an error correcting code cannot correct errors occurring on the channel with sufficient certainty.

In block 510, a retransmission request of the coded data block is then transmitted to the transmitter. The retransmission request can be carried out as a negative acknowledgement NACK message, for example. Correspondingly, when no retransmission is needed any longer, an acknowledgement ACK message can be transmitted. This can be implemented in practice for example such that the CCU, after detecting an error, transmits a bad frame indicator to the PCU, and the PCU generates a NACK message which the PCU then transmits to the CCU to be transmitted to the radio path.

As a result from this retransmission request, the code rate of the coded data block to be retransmitted is increased in block 512 by puncturing the coded data block 402 coded by the channel coding of the original transmission by using a second puncturing pattern 406. The second puncturing pattern 406 comprises fewer symbols to be transmitted than the first puncturing pattern 404. In the example of FIG. 4, the second puncturing pattern 406 comprises bits 100100100, i.e. only the first and the third symbol thereafter are retained, while other symbols are removed.

In block 514, a coded data block 410 punctured by the second puncturing pattern 406 is transmitted to the receiver. In accordance with FIG. 4, the punctured and coded data block 410 used in this retransmission comprises symbols 101, i.e. the first, fourth, and seventh symbol of the original channel-coded block 402.

Next, in block 516, the received coded data block 408 punctured by the first puncturing pattern 404 and the received coded data block 410 punctured by the second puncturing pattern 406 are combined. The data blocks can be combined because both data blocks 408, 410 are punctured versions of the same coded data block 402. In the example of FIG. 4, the second, third, fifth, sixth, eighth and ninth symbol of a combined coded data block 412 are obtained from the coded data block 408 punctured by the first puncturing pattern 404, and the first, fourth and seventh symbol are obtained from the coded data block 410 punctured by the second puncturing pattern 406. In the example, the puncturing patterns 404, 406 are completely separate, i.e. no symbol of the coded data block 402 is present both in the punctured block 408 and the punctured block 410. This is not necessary, however, but the same symbol of the coded data block 402 can occur in more than one punctured block 408, 410. It is, however, preferable that the symbols to be transmitted of the first puncturing pattern 404 and the second puncturing pattern 406 together comprise as many of the symbols of the coded data block 402 as possible.

Finally, the channel coding of the combined coded data block 412 is decoded in block 518. When a Viterbi decoder is used for decoding the convolutional coding used as the channel coding, it is then more likely that the soft bit decisions of symbols that have received more energy are more certain, depending, of course, on the temporary circumstances on the channel. After the channel coding is decoded, a data block 414 comprising user data is obtained.

When the method is used it is preferable that the code rate of the punctured coded data block does not exceed 1. Then, under favourable circumstances, only the original transmission is required in order to carry out decoding successfully.

TABLE 1

| MCS | Code Rate | Modulation | Number of Data Blocks in Radio Block | Amount of User Data in One Radio Block (Excluding Header) | Amount of Data in One Radio Block (Excluding Header) |
| --- | --- | --- | --- | --- | --- |
| MSC-9 | 1.0 | 8PSK | 2 | 592 + 592 | 612 + 612 |
| MCS-8 | 0.92 | 8PSK | 2 | 544 + 544 | 612 + 612 |
| MCS-7 | 0.76 | 8PSK | 2 | 448 + 448 | 612 + 612 |
| MCS-6 | 0.49 | 8PSK | 1 | 592 | 1248 |
| MCS-5 | 0.37 | 8PSK | 1 | 448 | 1248 |

TABLE 1-continued

| MCS | Code Rate | Modulation | Number of Data Blocks in Radio Block | Amount of User Data in One Radio Block (Excluding Header) | Amount of Data in One Radio Block (Excluding Header) |
| --- | --- | --- | --- | --- | --- |
| MCS-4 | 1.0 | GMSK | 1 | 352 | 372 |
| MCS-3 | 0.80 | GMSK | 1 | 296 | 372 |
| MCS-2 | 0.66 | GMSK | 1 | 224 | 372 |
| MCS-1 | 0.53 | GMSK | 1 | 176 | 372 |

Table 1 shows different modulation and coding schemes MCS of EGPRS. Of each MCS, the code rate of its original transmission, modulation method used, number of data blocks in a radio block, amount of user data (in bits) in a radio block and the amount of coded data (in bits) in one radio block is disclosed.

A radio block is transmitted every 20 ms. The radio block can be modulated using GMSK, whereby the radio block comprises 464 raw bits, or then modulation can be carried out by using 8-PSK, whereby the radio block comprises 1392 raw bits. Modulation and coding schemes MCS-7, MCS-8 and MCS-9 comprise two coded data blocks in each radio block. The sizes of user data blocks are the same in MCS-6 and MCS-9, and in MCS-5 and MCS-7.

When the method of the invention is used, a preferable combination of the modulation and coding schemes used in EGPRS in an original transmission and in a retransmission is one of the following:

modulation and coding scheme six MCS-6 and modulation and coding scheme nine MCS-9, modulation and coding scheme five MCS-5 and modulation and coding scheme seven MCS-7, and modulation and coding scheme six MCS-6 using padding bits and modulation and coding scheme eight MCS-8.

Thus, the invention does not require any changes in the headers or in the structures of the data blocks.

In all modulation and coding schemes, convolutional coding is used at a code rate ⅓. For example when an original transmission is carried out by using MCS-6, after channel coding the 612 user bits (592 bits+header) are represented by 1836 bits, from which, after puncturing in accordance with the example of FIG. 4, each user data symbol is represented by approximately two channel-coded symbols, i.e. 1250 bits. The code rate is thus 0.49. By using MCS-9 in retransmission, the 612 user data symbols (including header) are represented by 1836 bits, from which, after puncturing in accordance with the example of FIG. 4, 612 bits remain, i.e. the code rate is 1. The code rate of the combined data block obtained is 0.33, i.e. approximately ⅓. Indeed, the example of FIG. 4 roughly describes this combination of the modulation and coding schemes, simplified, however, to three user data symbols only. Based on what has been disclosed above, it is obvious to one skilled in the art how the method of the invention is applied to other combinations of modulation and coding schemes.

FIG. 3B is a simplified schematic block diagram further showing how the method of the invention differs from the prior art. When a data block F 332 is to be transferred over the radio link, it can first 334 be transmitted at a certain code rate and a retransmission 336 can then be carried out by using another code rate. The invention lies particularly in the fact that these transmissions 334, 336 with different code rates can be combined by using incremental redundancy.

Figure 2:
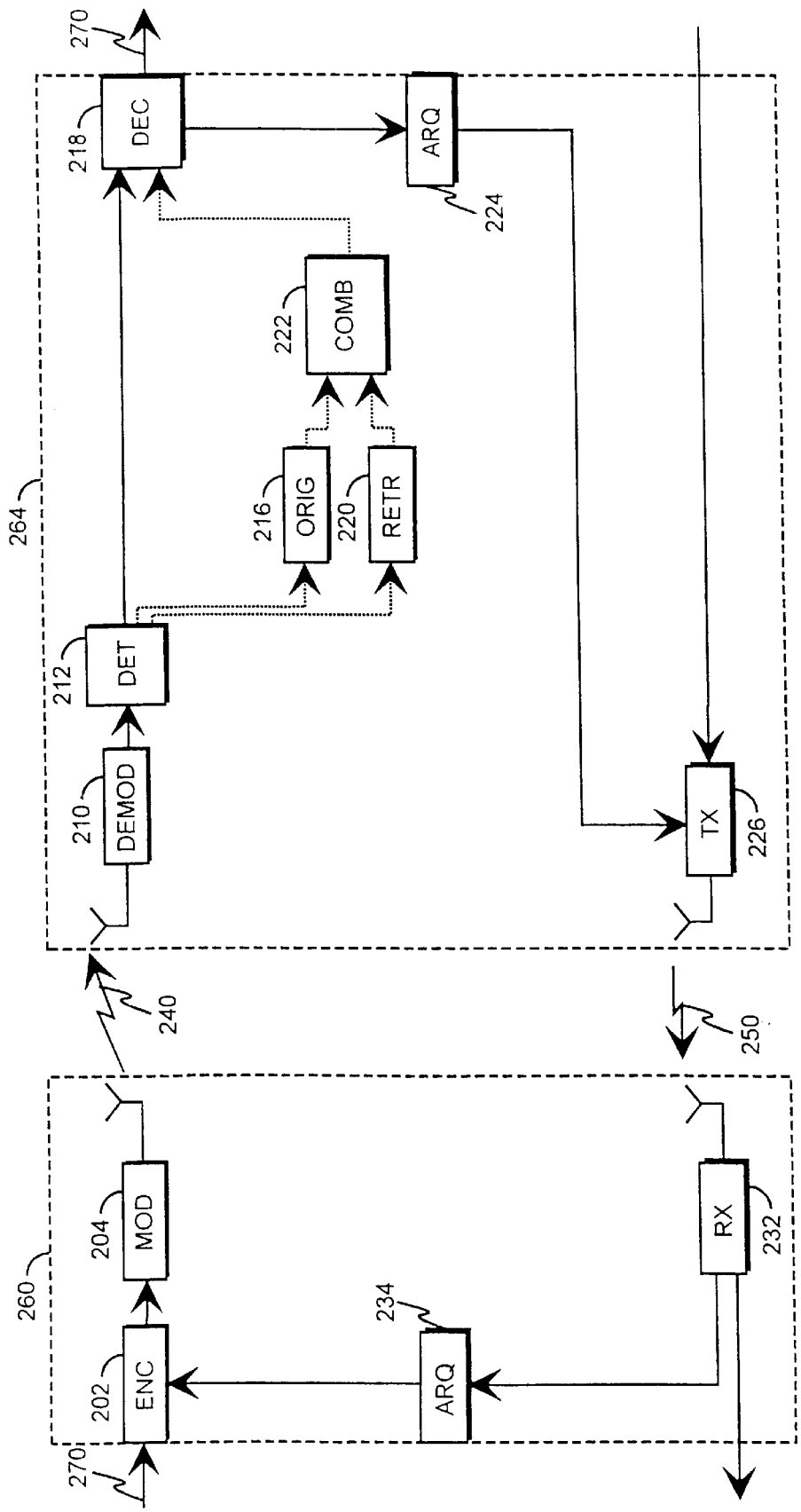
FIG. 2 is a simplified block diagram showing a transmitter and a receiver used in the invention.

FIG. 2 describes how the radio system of the invention can be implemented. The structure of a radio transmitter 260 is described on the left side of FIG. 2 and the structure of a radio receiver 264 on the right side of the figure. Only parts of the radio transmitter 260 and the radio receiver 264 that are essential for the invention are described.

The radio transmitter 260 comprises a channel coder 202 for channel coding a data block 270 into a coded data block by using a selected channel coding and for puncturing the coded data block by using a first puncturing pattern. The coded data block punctured by the first puncturing pattern is transmitted to a receiver by transmission means 204. The transmission means 204 comprise a modulator modulating digital signals to a radio frequency carrier wave. The transmission means can further comprise filters and amplifiers.

The radio transmitter 260 comprises means 232 for receiving a retransmission request of the coded data block transmitted on a radio connection 250. In order to receive the retransmission request, the radio transmitter 260 comprises a receiver, so the radio transmitter is, in fact, a transceiver.

The channel coder 202 increases the code rate of the coded data block to be retransmitted by puncturing the coded data block coded by the channel coding of the original transmission by using a second puncturing pattern that comprises fewer symbols to be transmitted than the first puncturing pattern. The transmission means 204 transmit the coded data block punctured by the second puncturing pattern to the receiver.

The radio receiver 264 comprises reception means 210 for receiving the coded data block channel-coded by the selected channel coding and punctured by the first puncturing pattern. The reception means 210 comprise a filter to block frequencies outside a desired frequency band. Next, the signal is converted to intermediate frequency or directly to baseband, in which form the signal is sampled and quantized at an analogue/digital converter. An optional equalizer compensates for interference, for example interference caused by multipath propagation.

A detected signal 212 is supplied to a channel decoder 218 decoding the received coded data block.

The radio receiver 264 comprises means 224 for detecting a need for retransmission of the received coded data block, and means 226 for transmitting the retransmission request of the coded data block to the transmitter 260 by using the radio link 250. The means 226 are implemented by a common radio transmitter, so the radio receiver 264 is a transceiver.

The reception means 210 receive a retransmitted coded data block 220 whose code rate has been increased by puncturing the coded data block coded by the channel coding of the original transmission by using the second puncturing pattern. The second puncturing pattern comprises fewer symbols to be transmitted than the first puncturing pattern.

The radio receiver 264 further comprises means 222 for combining a received coded data block 216 punctured by the first puncturing pattern and the coded data block 220 punctured by the second puncturing pattern. The coded data block 216 originally received is thus stored in the memory of the receiver. The channel decoder 218 decodes the channel coding of the combined coded data block.

The invention is preferably implemented by software, whereby the method of the invention requires relatively simple software changes in a closely-defined area in the radio transmitter 260 and the radio receiver 264. The channel coder 202, the channel decoder 218, the means 224, 234 for processing retransmission requests and the means 222 for combining are preferably implemented as software, for example as software to be executed in a general purpose processor. Implementation by hardware is also feasible, for example as application specific integrated circuit ASIC or as control logic constructed from separate components.

The cases described in the examples are basic cases; the invention disclosed in the claims also covers different combined cases, for example a case wherein the original transmission and a first retransmission are carried out using the same code rate, and a second retransmission is carried out using an increased code rate. Similarly, a case is also feasible wherein more than one retransmission is carried out by using an increased code rate, a combined coded data block then being generated from a desired number of received data blocks. The essential point for the invention only is that the combined coded data block is generated from at least two data blocks coded by different code rates.

Although the invention has been described above with reference to the example in accordance with the accompanying drawings, it is obvious that the invention is not restricted thereto but can be modified in many ways within the scope of the inventive idea disclosed in the attached claims.

What is claimed is:

1. A method of transmitting data in a radio system from a transmitter to a receiver, the method comprising:

channel coding a data block into a coded data block by using a selected channel coding;

puncturing the coded data block by using a first puncturing pattern;

transmitting the coded data block punctured by the first puncturing pattern to the receiver;

detecting a need for retransmission of the received coded data block;

transmitting a retransmission request of the coded data block to the transmitter;

increasing the code rate of the coded data block to be retransmitted by puncturing the coded data block coded by the channel coding of the original transmission using a second puncturing pattern including fewer symbols to be transmitted than the first puncturing pattern;

transmitting the coded data block punctured by the second puncturing pattern to the receiver;

combining the received coded data block punctured by the first puncturing pattern and the received coded data block punctured by the second puncturing pattern; and decoding the channel coding of the combined coded data block.

2. The method of claim 1, wherein the symbols to be transmitted of the first puncturing pattern and the second puncturing pattern together comprising as many of the symbols of the coded data block as possible.

3. The method of claim 1, wherein the code rate of the punctured coded data block does not exceed 1.

4. The method of claim 1, wherein a combination of modulation and coding schemes used in an EGPRS in an original transmission and in a retransmission being one of the following:

modulation and coding scheme six and modulation and coding scheme nine, modulation and coding scheme five and modulation and coding scheme seven, and modulation and coding scheme six using padding bits and modulation and coding scheme eight.

5. A radio system comprising:

a transmitter and a receiver having a radio connection to the transmitter;

the transmitter comprising a channel coder for channel coding a data block into a coded data block by using a selected channel coding and for puncturing the coded data block by using a first puncturing pattern, and transmission means for transmitting the coded data block punctured by the first puncturing pattern to the receiver; and the receiver comprising a channel decoder for decoding the received coded data block, means for detecting a need for retransmission of the received coded data block, and means for transmitting a retransmission request of the coded data block to the transmitter; wherein:

the channel coder increases the code rate of the coded data block to be retransmitted by puncturing the coded data block coded by the channel coding of the original transmission by using a second puncturing pattern comprising fewer symbols to be transmitted than the first puncturing pattern;

the transmission means transmit the coded data block punctured by the second puncturing pattern to the receiver;

the receiver comprises means for combining a received coded data block punctured by the first puncturing pattern and a received coded data block punctured by the second puncturing pattern; and the channel decoder decodes the channel coding of the combined coded data block.

6. The radio system of claim 5, wherein the symbols to be transmitted of the first puncturing pattern and the second puncturing pattern together comprise as many of the symbols of the coded data block as possible.

7. The radio system of claim 5, wherein the code rate of the punctured coded data block does not exceed 1.

8. The radio system of claim 5, wherein the combination of the modulation and coding schemes used in EGPRS in an original transmission and in a retransmission is one of the following:

modulation and coding scheme six and modulation and coding scheme nine, modulation and coding scheme five and modulation and coding scheme seven, and modulation and coding scheme six using padding bits and modulation and coding scheme eight.

9. A radio transmitter comprising:

a channel coder for channel coding a data block into a coded data block by using a selected channel coding and for puncturing the coded data block by using a first puncturing pattern;

transmission means for transmitting the coded data block punctured by the first puncturing pattern to a receiver; and means for receiving a retransmission request of the coded data block; wherein:

the channel coder increases the code rate of the coded data block to be retransmitted by puncturing the coded data block coded by the channel coding of the original transmission using a second puncturing pattern comprising fewer symbols to be transmitted than the first puncturing pattern;

the transmission means transmit the coded data block punctured by the second puncturing pattern to the receiver.

10. A radio receiver comprising:

reception means for receiving a coded data block channel-coded by a selected channel coding and punctured by a first puncturing pattern;

a channel decoder for decoding the received coded data block;

means for detecting a need for retransmission of the received coded data block; and means for transmitting a retransmission request of the coded data block to a transmitter;

wherein:

the reception means receive the retransmitted coded data block whose code rate has been increased by puncturing the coded data block coded by the channel coding of the original transmission by using a second puncturing pattern comprising fewer symbols to be transmitted than the first puncturing pattern;

the reception means includes means for combining the received coded data block punctured by the first puncturing pattern and the received coded data block punctured by the second puncturing pattern;

a channel decoder decodes the channel coding of the combined coded data block.

* * * * *